(12) United States Patent
Kobayashi

(10) Patent No.: US 10,110,886 B2
(45) Date of Patent: Oct. 23, 2018

(54) DISPLAY DEVICE

(71) Applicant: YAZAKI CORPORATION, Tokyo (JP)

(72) Inventor: Ryo Kobayashi, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 403 days.

(21) Appl. No.: 14/964,778

(22) Filed: Dec. 10, 2015

(65) Prior Publication Data

US 2016/0094839 A1 Mar. 31, 2016

Related U.S. Application Data

(63) Continuation of application No. PCT/JP2014/065747, filed on Jun. 13, 2014.

(30) Foreign Application Priority Data

Jun. 20, 2013 (JP) ................. 2013-129912

(51) Int. Cl.
| | |
|---|---|
| *G06F 3/048* | (2013.01) |
| *H04N 13/398* | (2018.01) |
| *B60K 35/00* | (2006.01) |
| *G01D 7/04* | (2006.01) |
| *B60K 37/02* | (2006.01) |

(52) U.S. Cl.
CPC ........... *H04N 13/398* (2018.05); *B60K 35/00* (2013.01); *B60K 37/02* (2013.01); *G01D 7/04* (2013.01); *B60K 2350/1064* (2013.01); *B60K 2350/1072* (2013.01); *B60K 2350/20* (2013.01); *B60K 2350/408* (2013.01)

(58) Field of Classification Search
CPC ........... G06F 2203/04112; G06F 3/044; G06F 3/0412; G06F 1/16; G06F 2203/04103; G06F 17/5009; G06F 3/041; G06F 3/047; G06F 3/048; G06F 3/0482; G06F 17/5081; G06F 2203/0333; G06F 2203/04107; G06F 2203/04111; G06F 2217/06; G06F 3/0304; G06F 3/0312; G06F 3/03542; G06F 3/03543; G06F 3/03545; G06F 3/03549; G06F 3/0362; G06F 3/038; G06F 3/0386; G06F 3/0418; G06F 3/045; G06F 3/04842; G06F 3/04847; G06F 3/0488; G06F 3/1423; G06F 3/165
See application file for complete search history.

(56) References Cited

FOREIGN PATENT DOCUMENTS

| | | |
|---|---|---|
| JP | 2000-221915 A | 8/2000 |
| JP | 2010-58633 A | 3/2010 |
| JP | 2010-71907 A | 4/2010 |
| JP | 2011-121544 A | 6/2011 |
| JP | 2012-30703 A | 2/2012 |

OTHER PUBLICATIONS

International Search Report for PCT/JP2014/065747 dated Jul. 15, 2014.

*Primary Examiner* — Di Xiao
(74) *Attorney, Agent, or Firm* — Sughrue Mion, PLLC

(57) ABSTRACT

A display device displays a plurality of display elements having respective densities that continuously change in a first direction (an X direction), in such an arrangement that the display elements constitute a pointer needle and the densities continuously change in a second direction (a Y direction) intersecting the first direction, thereby displaying the pointer needle on a display section. This provides a display device with improved stereoscopic vision of the pointer needle.

6 Claims, 4 Drawing Sheets

+

+

+

DISPLAY DEVICE

CROSS-REFERENCE TO RELATED APPLICATION

This application is a continuation application of International Application PCT/JP2014/065747, filed on Jun. 13, 2014, and designating the U.S., the entire contents of which are incorporated herein by reference.

BACKGROUND OF THE INVENTION

1. Field of the Invention

The present invention relates to a display device that can be used for a meter unit and the like for a vehicle that displays measuring instruments such as a speedometer and a fuel gauge. In particular, the present invention relates to a display device that can provide graphics display.

2. Description of the Related Art

In recent years, graphical meters with an image display system have been known. In the system, a display device such as a liquid crystal display is used for displaying vehicle meters on a screen (refer to Japanese Patent Application Laid-open No. 2000-221915, for example). Also in such a graphical meter, to achieve similar display to conventional measuring instruments with pointer needles, a scale and a pointer needle are typically displayed and the tip of the pointer needle indicates a portion on the scale, thereby indicating given numeric value information.

In recent years, in order to achieve a more preferable display device, improved stereoscopic vision of the pointer needle has been required.

SUMMARY OF THE INVENTION

In view of the circumstances described above, the present invention aims to provide a display device with improved stereoscopic vision of a pointer needle.

To achieve the above-described objective, a display device according to one aspect of the present invention includes a display section configured to display various display contents including a pointer needle; and a controller coupled to the display section, wherein the controller is configured to display a plurality of display elements having respective densities that continuously change in a first direction, in such an arrangement that the display elements constitute the pointer needle and the densities continuously change in a second direction intersecting the first direction, thereby displaying the pointer needle on the display section.

According to another aspect of the present invention, in the display device, it is preferable that the plurality of display elements are display elements having bar shapes with different widths with each other, and the controller is configured to display the display elements in such an arrangement that a display element having a smaller width is overlaid on a display element having a larger width, thereby displaying the pointer needle on the display section.

Typically, display screens in a graphical meter are drawn with a vector graphics method, in which images are represented through calculation based on numeric value data such as coordinates of points and lines connecting them (vectors). With the vector graphics method, gradation (continuous change of density) can be applied only in a single direction for each display element due to a limitation in function of the method.

Therefore, when gradation is applied to the pointer needle to add stereoscopic vision thereto, the gradation can be applied only in a single direction. If the gradation can be applied to the pointer needle in two or more directions, the pointer needle with improved stereoscopic vision can be expected.

Using an image for displaying the pointer needle achieves the pointer needle to which the gradation has been applied in two or more directions. Specifically, an image representing the pointer needle to which the gradation has been applied in two directions is stored in a memory and then output on a screen to display the pointer needle. The display method using such an image causes, however, data transfer and drawing processing to slow down, which is unsuitable for displaying the pointer needle that requires high-speed movement and clear display. Using an image also requires additional memory capacity.

By contrast, the display device with the configuration as described above in one aspect of the present invention displays a plurality of display elements each having density that continuously changes in the first direction, in such a manner that the density continuously changes in the second direction, thereby displaying the pointer needle to which the gradation has been applied in both the first and the second directions. In this manner, even when the vector graphics method is used, gradation is applied to the pointer needle in two directions, thereby achieving improved stereoscopic vision of the pointer needle. The display device using no image achieves data transfer and drawing processing without degrading performance, thereby achieving high-speed movement and clear display. The display device using no image eliminates necessity of additional memory capacity.

The display device with the configuration as described above in another aspect of the present invention that displays the pointer needle with its display elements overlaid with each other achieves improved smoothness of display of the pointer needle.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes a display device according to the present embodiment with reference to the accompanying drawings. The display device according to the present embodiment is applied to a graphical meter installed in an instrument panel inside a vehicle compartment.

Figure 1:
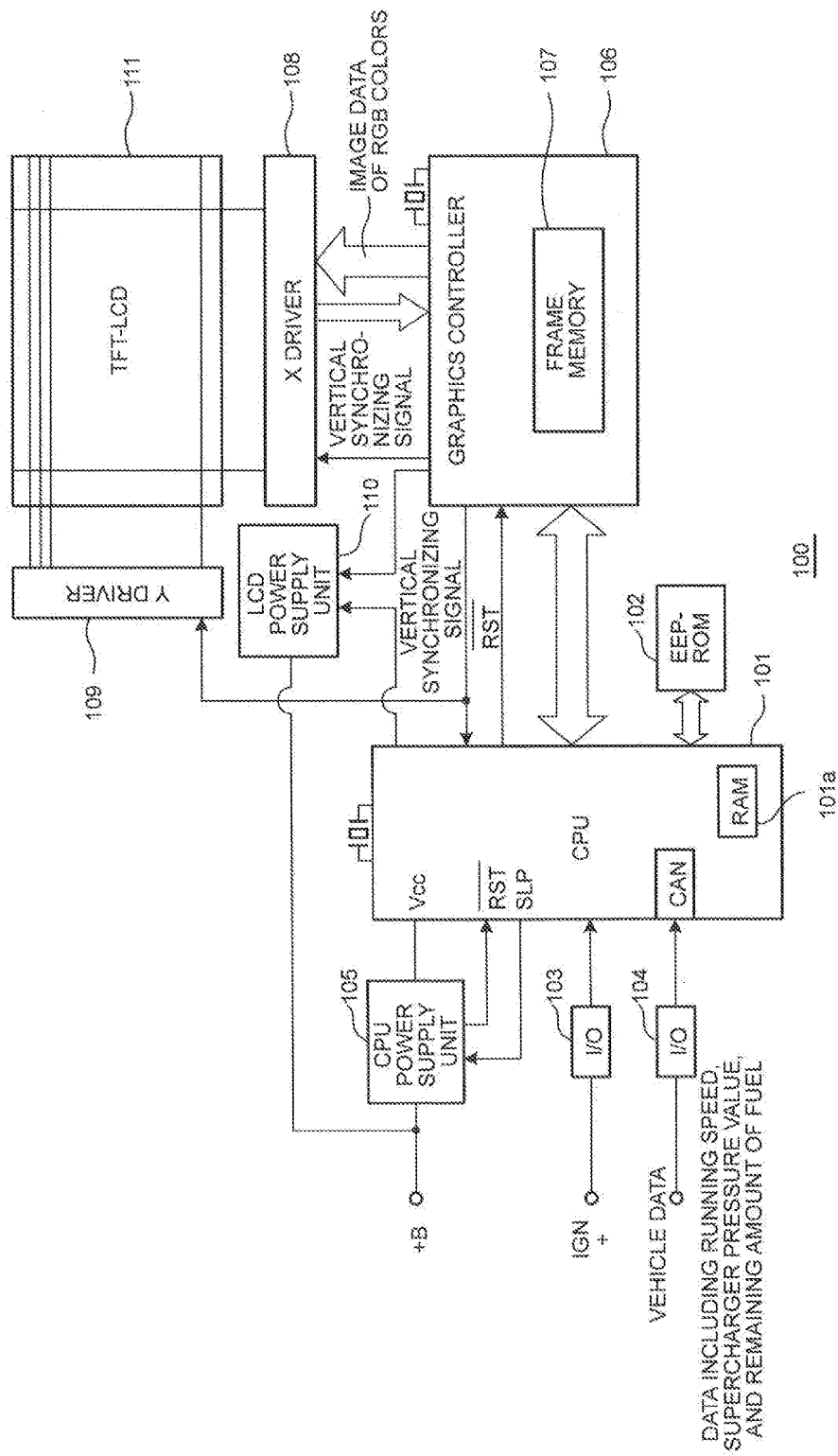
FIG. 1 is a block diagram illustrating an example of the hardware configuration of a display device according to the present embodiment.

FIG. 1 is a block diagram illustrating an example of the hardware configuration of a display device 100 that is a display device according to the present embodiment. As illustrated in FIG. 1, the display device 100 includes a controller (a microcomputer, a central processing unit (CPU)) 101, a read-only memory (an electrically erasable programmable read-only memory (EEPROM)) 102, an interface 103, an interface 104, a CPU power supply unit 105, a graphics controller 106, a frame memory 107, an X driver 108, a Y driver 109, a liquid crystal display (LCD) power supply unit 110, a display section (a liquid crystal display, a thin film transistor liquid crystal display (TFT-LCD)) 111, and other components.

Figure 3A:
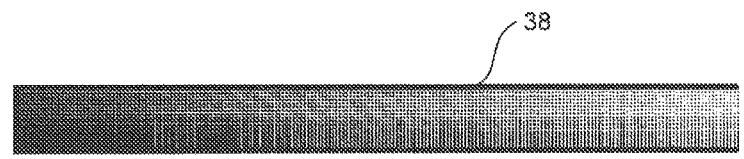
FIG. 3A is a diagram for explaining a display method of a pointer needle and illustrating a display mode of the pointer needle.
Figure 3A:
Figure 3B:
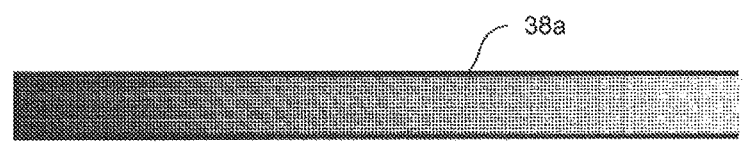
FIG. 3B is a diagram for explaining a display method of the pointer needle and illustrating display elements included in the pointer needle.
Figure 3B:
Figure 3B:
Figure 3B:
Figure 3B:

The controller 101 includes a microcomputer, for example. The controller 101 executes a previously prepared computer program and various types of processing needed to implement the functions of the display device 100. For example, the controller 101 executes drawing processing of a later-described pointer needle as illustrated in FIGS. 3A and 3B, by using a drawing program based on a vector graphics method. The controller 101 includes a random access memory (RAM) 101a for transitorily storing therein various types of data. The RAM 101a stores therein various types of data.

The read-only memory 102 retains various types of fixed data including details of the computer program executed by the controller 101 or the data representing later-described display elements 38a to 38d.

The interface 103 inputs a signal (IGN+) indicating the state of an ignition switch on the vehicle side to the controller 101.

The interface 104 is utilized for communications based on the controller area network (CAN) protocol between the controller 101 and various types of control devices (electric control units (ECUs)) on the vehicle side. Specifically, the data representing the current values of various types of quantity of states of a vehicle, such as a running speed, a supercharger pressure value, and the remaining amount of fuel, is input from the vehicle side through the interface 104 to the controller 101 as substantially real-time data.

For example, the interface 104 receives a vehicle speed pulse signal output from a speed sensor mounted on the vehicle side every time the vehicle moves for a given amount of distance. The interface 104 then outputs the received signal to the controller 101 as running speed information representing the value of the current vehicle running speed.

The interface 104 also receives a signal representing the current value of the supercharger pressure value (the boost value) output from a pressure sensor detecting the pressure of compressed air forcibly supplied to an internal combustion engine by a supercharger. The interface 104 then outputs the received signal to the controller 101 as supercharger pressure information representing the current supercharger pressure value.

The CPU power supply unit 105 receives a direct-current power supplied from a positive-side power supply line (+B) on the vehicle side and generates a direct-current voltage (Vcc) necessary for the operation of the controller 101. The CPU power supply unit 105 generates a reset signal (RST) and performs an operation for reducing power supply according to a sleep signal (SLP) output from the controller 101, as necessary.

The display section 111 includes, for example, a liquid crystal display that is a TFT-LCD, which includes a two-dimensional color display screen including a large number of micro display cells including liquid crystal devices and arranged in X and Y directions. The display section 111 is a display device with an image display system that controls the display states of the large number of micro display cells individually, thereby providing graphics display of desired information such as diagrams, characters, and images, on a two-dimensional display screen.

Figure 2:
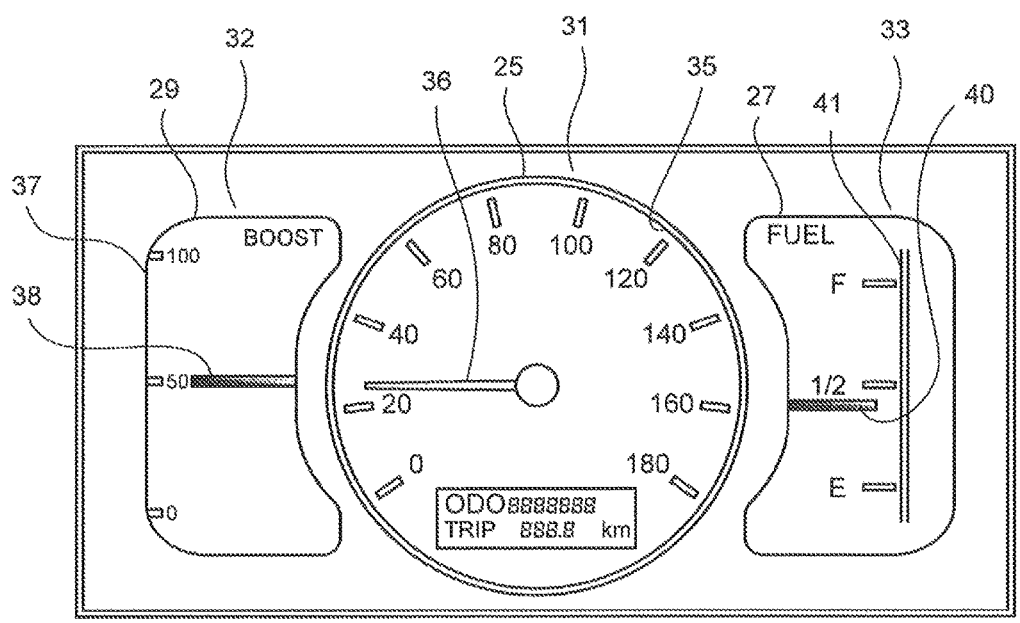
FIG. 2 is a diagram illustrating a graphics display screen of a display section.
Figure 2:
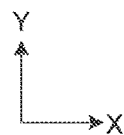

FIG. 2 is a diagram illustrating a graphics display screen of the display section 111. The graphics display screen includes a first display area 31, a second display area 32, and a third display area 33 each displaying a different area. In the descriptions below, the lateral direction in FIG. 2 is denoted as an X direction and the longitudinal direction is denoted as a Y direction.

The first display area 31 is an area for displaying the current vehicle running speed. In the first display area 31, a speed scale 35 and a pointer needle 36 are displayed as a speedometer 25. The pointer needle 36 indicates a portion on the speed scale 35 by its tip, thereby indicating the current vehicle running speed.

The second display area 32 is an area for displaying a presentation amount (a gauge value) of the current supercharger pressure value. In the second display area 32, a pressure value scale 37 and a pointer needle 38 are displayed as a boost gauge 29. The supercharger pressure value is presented as numeric value information, specifically, as the ratio (percentage) relative to the predetermined maximum value, as represented in Expression (1):

$$\text{Scale}\,[\%] = \frac{\text{Measured value } [\text{kgf/cm}^2]}{\text{Boost pressure maximum value } [\text{kgf/cm}^2]}$$

The pressure value scale 37 is disposed on the left end of the second display area 32, as a portion of the frame of the boost gauge 29. On the pressure value scale 37, scale marks are provided that represent values of 0, 50, and 100, respectively. The pointer needle 38 is displayed in a bar shape extending in the transverse direction in FIG. 2. The pointer needle 38 is disposed on the right side of the pressure value scale 37 and moves in the vertical direction along the pressure value scale 37. The pointer needle 38 indicates a portion on the pressure value scale 37 by its tip, thereby indicating a supercharger pressure value.

The third display area 33 is an area for displaying the current remaining amount of fuel. In the third display area 33, a fuel scale 41 and a pointer needle 40 are displayed as a fuel gauge 27. The pointer needle 40 indicates a portion on the fuel scale 41, thereby indicating the current remaining amount of fuel.

Description will be continued with reference to FIG. 1 again. The scanning position on the display screen of the display section 111 in the Y direction is sequentially switched according to an output by the Y driver 109. The Y driver 109 sequentially switches the scanning position in the Y direction, in synchronization with a vertical synchronizing signal output from the graphics controller 106.

The X driver 108 sequentially switches the scanning position on the display screen of the display section 111 in the X direction, in synchronization with a horizontal synchronizing signal output from the graphics controller 106. The X driver 108 controls the display contents on the screen by providing image data of respective RGB colors output from the graphics controller 106 to the display cells at the scanning position.

The graphics controller 106 displays various graphic elements on the screen of the display section 111 according to various instructions input from the controller 101. In practice, when the controller 101 or the graphics controller 106 writes display data on the frame memory 107, the controller 101 or the graphics controller 106 performs drawing based on the vector graphics method. In addition, the graphics controller 106 generates a vertical synchronizing signal and a horizontal synchronizing signal for two-dimensional scanning on the screen of the display section 111. The graphics controller 106 then provides, to the display section 111, display data stored in the frame memory 107 at a corresponding address at a timing synchronized with these synchronizing signals.

The LCD power supply unit 110 receives direct-current power supplied from the positive-side power supply line (+B) on the vehicle side and generates given direct-current power necessary for display on the display section 111.

The following describes a display mode of the pointer needle 38 of the boost gauge 29. The pointer needle 38 of the boost gauge 29 is described as an example here, and the pointer needle 36 of the speedometer 25, or the pointer needle 40 of the fuel gauge 27 may also be displayed in the same manner.

FIG. 3A and FIG. 3B are diagrams for explaining a display method of the pointer needle 38. FIG. 3A illustrates a display mode of the pointer needle 38 and FIG. 3B illustrates display elements 38a to 38d included in the pointer needle 38. As illustrated in FIG. 3A, in the pointer needle 38, gradation (continuous change of density) is provided in two directions, that is, in its longitudinal direction and width direction. This allows the pointer needle 38 to be displayed in FIG. 3A in such a manner that light is projected on the pointer needle 38 from the upper right side (that is, from the upper side of the speedometer 25) toward the negative Y direction. As a result, the pointer needle 38 is displayed as if it had a stereoscopic surface shape.

The pointer needle 38 that is a display target is drawn with the vector graphics method, in which images are represented through calculation based on numeric value data such as coordinates of points and lines connecting them (vectors). As described above, with the vector graphics method, gradation cannot be applied in multiple directions due to a limitation in function of the method, that is, gradation in only a single direction can be represented.

In the present embodiment, as illustrated in FIG. 3B, the four bar-shaped display elements 38a, 38b, 38c, and 38d necessary for display of the pointer needle 38 are displayed in such an arrangement that they constitute the shape of the pointer needle 38, and in such an arrangement that gradation is also applied in the second direction (the Y direction) orthogonal to the first direction (the X direction), thereby representing the gradation in two directions.

The display element 38a is a display element having the outline of the pointer needle 38 and a light gradation in the longitudinal direction. The display element 38b has a smaller width than that of the display element 38a and a darker gradation than that of the display element 38a in the longitudinal direction. The display element 38c has a smaller width than that of the display element 38b and a darker gradation than that of the display element 38b in the longitudinal direction. The display element 38d has a smaller width than that of the display element 38c and a darker gradation than that of the display element 38c in the longitudinal direction.

The controller 101 (or the graphics controller 106) aligns the display elements 38a to 38d having bar shapes with different widths with each other, at their lower ends, thereby displaying the pointer needle 38. For example, the display elements 38a to 38d are displayed in such an arrangement that the respective lower left corners of the display elements 38a to 38d are positioned at the same coordinates. Specifically, the controller 101 displays the four display elements 38a to 38d in such an arrangement that a display element having a smaller width is overlaid on a display element having a larger width, thereby displaying the pointer needle 38 on the display section 111.

Figure 4A:
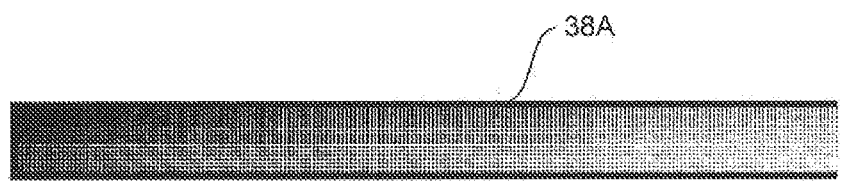
FIG. 4A is a diagram illustrating a display mode of the pointer needle in which the display elements in FIG. 3A and FIG. 3B are arranged with another method.
Figure 4A:
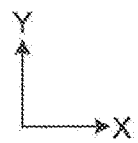
Figure 4B:
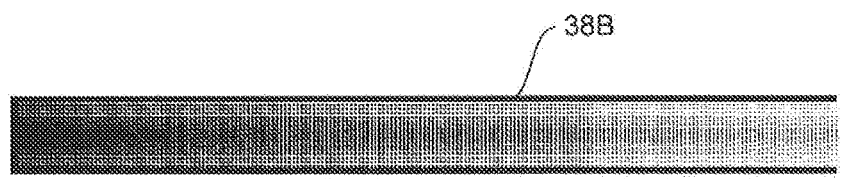
FIG. 4B is a diagram illustrating a display mode of the pointer needle in which the display elements in FIG. 3A and FIG. 3B are arranged with another method.
Figure 4B:
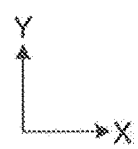

In the present embodiment, the four display elements 38a to 38d are arranged in such a manner that their lower ends are aligned; however, the four display elements 38a to 38d may be arranged with another method. FIG. 4A and FIG. 4B are diagrams illustrating display modes of the pointer needle in which the display elements in FIG. 3A and FIG. 3B are arranged with another method.

FIG. 4A illustrates that the four display elements 38a to 38d are arranged in such a manner that their upper ends are aligned, thereby displaying a pointer needle 38A. In this case, the pointer needle 38A is displayed in such a manner that light is projected on the pointer needle 38A from the lower right side (that is, from the lower side of the speedometer 25) toward the positive Y direction. As a result, the pointer needle 38A is displayed as if it had a stereoscopic surface shape. FIG. 4B illustrates that the four display elements 38a to 38d are arranged in such a manner that their centers are aligned, thereby displaying a pointer needle 38B. In this case, the pointer needle 38B is displayed in such a manner that light is projected on the pointer needle 38B from the right side toward the negative X direction. As a result, the pointer needle 38B is displayed as if it had a stereoscopic surface shape.

As described above, the display device 100 according to the present embodiment displays the display elements 38a to 38d each having density that continuously changes in the first direction (the X direction), in such an arrangement that the density continuously changes in the second direction (the Y direction), thereby displaying the pointer needle 38 to which gradation has been applied in both the first and second directions. Thus, even if the vector graphics method is used, gradation is applied to the pointer needle 38 in two directions, thereby achieving improved stereoscopic vision of the pointer needle 38. The display device 100 using no image achieves data transfer and drawing processing without degrading performance, thereby achieving high-speed movement and clear display. The display device 100 using no image also eliminates necessity of additional memory capacity.

The following summarizes the display device 100 according to the present embodiment.

(1) The display device 100 according to the embodiment is a display device that includes the display section 111 displaying various display contents including the pointer needle 38; and the controller 101 coupled to the display section 111. The controller 101 displays the display elements 38a to 38d each having density that continuously changes in the first direction (the X direction), in such an arrangement that the display elements constitute the shape of the pointer needle 38 and the density continuously changes in the second direction (the Y direction) intersecting the first direction, thereby displaying the pointer needle 38 on the display section 111.

(2) In the display device 100 according to the embodiment, the display elements 38*a* to 38*d* have bar shapes with different widths with each other. The controller 101 displays the display elements 38*a* to 38*d* in such an arrangement that a display element having a smaller width is overlaid on a display element having a larger width, thereby displaying the pointer needle 38 on the display section 111.

The scope of the technology in the present invention is not limited to the above-described embodiment. The embodiment can be modified and improved in various ways within the scope of the technology in the present invention.

For example, in the above-described embodiment, the pointer needle includes the four display elements. Alternatively, the pointer needle may include five or more display elements, which can provide more detailed representation. The pointer needle may also include three or less display elements.

In the above-described embodiment, the gradation is drawn in two directions orthogonal to each other. Alternatively, the gradation may be drawn in two directions intersecting each other, which can provide more diverse representation.

In the above-described embodiment, the gradation is drawn in two directions in monochrome display. Alternatively, the gradation may be drawn in two directions in color display, which can provide more colorful and stereoscopic representation.

In the above-described embodiment, the pointer needle has a bar shape. Alternatively, the pointer needle may have an arrow shape or a trapezoidal shape with a pointed tip, which achieves pointer needles having various external shapes.

The present invention can provide a display device with improved stereoscopic vision of a pointer needle.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
a display section configured to display various display contents including a pointer needle; and
a controller coupled to the display section, wherein
the controller is configured to display a plurality of display elements having respective densities that continuously change in a first direction, in such an arrangement that the display elements comprise the pointer needle and a density of the pointer needle continuously change in the first direction and a second direction intersecting the first direction, thereby displaying the pointer needle on the display section.

2. The display device according to claim 1, wherein
the plurality of display elements are display elements having bar shapes with different widths with each other, and
the controller is configured to display the display elements in such an arrangement that a display element having a smaller width is overlaid on a display element having a larger width, thereby displaying the pointer needle on the display section.

3. The display device according to claim 2, wherein
the controller is configured to display the plurality of display elements in such an arrangement that a bottom end of each display element in the plurality of display elements is aligned with each other.

4. The display device according to claim 2, wherein
the controller is configured to display the plurality of display elements in such an arrangement that a top end of each display element in the plurality of display elements is aligned with each other.

5. The display device according to claim 2, wherein
the controller is configured to display the plurality of display elements in such an arrangement that a center of each display element in the plurality of display elements, in a height direction of the plurality of display elements, is aligned with each other.

6. The display device according to claim 1, wherein
the controller is configured to display the pointer needle with gradation in the first direction and the second direction, thereby achieving improved stereoscopic vision of the pointer needle.

* * * * *